(12) United States Patent
Hunt

(10) Patent No.: US 9,677,569 B2
(45) Date of Patent: Jun. 13, 2017

(54) BI-DIRECTIONAL HYDROSTATIC THRUST BEARING FOR A ROTATING MACHINE

(71) Applicant: Fluid Equipment Development Company, Monroe, MI (US)

(72) Inventor: Jason B. Hunt, Monroe, MI (US)

(73) Assignee: Fluid Equipment Development Company, LLC, Monroe, MI (US)

( * ) Notice: Subject to any disclaimer, the term of this patent is extended or adjusted under 35 U.S.C. 154(b) by 624 days.

(21) Appl. No.: 14/187,632

(22) Filed: Feb. 24, 2014

(65) Prior Publication Data

US 2015/0240828 A1    Aug. 27, 2015

Related U.S. Application Data

(60) Provisional application No. 61/767,852, filed on Feb. 22, 2013.

(51) Int. Cl.
*F04D 29/041* (2006.01)
*F16C 32/06* (2006.01)
(Continued)

(52) U.S. Cl.
CPC ........... *F04D 29/0413* (2013.01); *F04D 1/04* (2013.01); *F04D 17/08* (2013.01); *F04D 29/06* (2013.01);
(Continued)

(58) Field of Classification Search
CPC .. F04D 29/0413; F04D 29/046; F04D 29/047; F04D 29/0473; F04D 29/0476; F04D 29/05; F04D 29/051; F04D 29/056; F04D 29/057; F16C 32/0648; F16C 32/0692

See application file for complete search history.

(56) References Cited

U.S. PATENT DOCUMENTS 1,146,078 A * 7/1915 Krogh .................. F04D 29/041
                                                     415/104
1,323,412 A * 12/1919 Schorr .................. F04D 29/041
                                                     415/104
(Continued)

FOREIGN PATENT DOCUMENTS

FR          2624226      *   6/1989

*Primary Examiner* — Christopher Verdier
*Assistant Examiner* — Brian O Peters
(74) *Attorney, Agent, or Firm* — Harness, Dickey & Pierce, PLC

(57) ABSTRACT

A fluid machine in communication with a thrust bearing fluid source includes a housing having a bearing portion receiving fluid from the fluid source. A bearing chamber is formed in the bearing portion. An extension of a rotor is positioned within the bearing chamber so that a first pocket is disposed adjacent to a first side of the extension and a second pocket is disposed adjacent to a second side of the extension. An extension lateral side is adjacent to the bearing chamber lateral side. The extension comprises a first channel extending from a first half of the extension lateral side to the first pocket. The extension comprises a second channel extending from a second half of the extension lateral side opposite the first channel to the second pocket. The bearing chamber receives fluid from the bearing channel which is communicated to the first and second channels and the pockets.

15 Claims, 5 Drawing Sheets

(51) Int. Cl.
*F04D 1/04* (2006.01)
*F04D 17/08* (2006.01)
*F04D 29/06* (2006.01)
*F04D 29/10* (2006.01)
*F04D 29/22* (2006.01)

(52) U.S. Cl.
CPC ............. *F04D 29/10* (2013.01); *F04D 29/22* (2013.01); *F16C 32/0648* (2013.01); *F16C 32/0692* (2013.01); *F16C 2360/44* (2013.01)

(56) References Cited

U.S. PATENT DOCUMENTS

| | | | | |
|---|---|---|---|---|
| 2,449,297 | A * | 9/1948 | Hoffer | F16C 32/0659 384/115 |
| 3,671,137 | A * | 6/1972 | Ball | F04D 29/047 384/99 |
| 4,867,633 | A * | 9/1989 | Gravelle | F04D 29/167 415/106 |
| 5,163,812 | A * | 11/1992 | Klaus | F04D 29/0413 384/404 |
| 5,980,114 | A * | 11/1999 | Oklejas, Jr. | F04D 29/041 384/123 |
| 6,071,091 | A * | 6/2000 | Lemieux | F01D 3/04 417/423.1 |
| 8,016,545 | B2 * | 9/2011 | Oklejas, Jr. | F04D 29/0416 415/106 |

* cited by examiner

BI-DIRECTIONAL HYDROSTATIC THRUST BEARING FOR A ROTATING MACHINE

CROSS-REFERENCE TO RELATED APPLICATIONS

This application claims the benefit of U.S. Provisional Application No. 61/767,852 filed on Feb. 22, 2013. The disclosure of the above application is incorporated herein by reference.

TECHNICAL FIELD

The present disclosure relates generally to rotating pumps or rotating fluid machinery, and, more specifically, to a thrust bearing and lubrication of the thrust bearing within a fluid machine.

BACKGROUND

The statements in this section merely provide background information related to the present disclosure and may not constitute prior art.

Rotating fluid machines are used in many applications for many processes. Lubrication for a rotating fluid machine is important. Various types of fluid machines use a thrust bearing that is lubricated by the pumpage. Adequate flow of pumpage should be supplied to obtain proper lubrication.

The pumpage can be used for lubrication provided that the pumpage is kept free of debris, which can get caught in various clearances such as thrust bearing clearances. Not all debris is harmful, just the debris that can get caught in the clearances inside the pump like thrust bearing clearances. Of course, lubricating with clean fluid may be useful for various types of rotating machines. Fracking and other highly dirty or hazardous operations benefit from using filtered or screened fluids. Filtered or screened fluids are not necessarily debris free but have reduced solid contaminates below a certain size.

Further areas of applicability will become apparent from the description provided herein. It should be understood that the description and specific examples are intended for purposes of illustration only and are not intended to limit the scope of the present disclosure.

SUMMARY

This section provides a general summary of the disclosure, and is not a comprehensive disclosure of its full scope or all of its features.

The present disclosure provides an improved method for lubricating a rotating machine during operation. The system provides fluid to the thrust bearing over the entire operating range of the device.

In one aspect of the disclosure, a fluid machine is in communication with a thrust bearing fluid source and includes a housing having a bearing portion with a bearing surface. The bearing portion comprises a bearing channel receiving fluid from the fluid source. A rotating portion rotates at least partially disposed within the housing. The rotating portion has a sealing surface directly adjacent to the bearing surface. A thrust bearing is disposed between the rotating portion and the bearing portion. The thrust bearing comprises a bearing chamber formed within the bearing portion and a bearing chamber lateral side. The bearing chamber receives fluid from the bearing channel through the bearing chamber lateral side. An extension extends from the sealing surface of the rotating portion. The extension is positioned within the bearing chamber so that a first pocket of the bearing chamber is disposed adjacent to a first side of the extension and a second pocket of the bearing chamber is disposed adjacent to a second side of the extension. The extension comprises an extension lateral side extending between the first side and the second side. The extension lateral side is adjacent to the bearing chamber lateral side. The extension comprises a first channel extending from a first half of the extension lateral side to the first pocket. The extension comprises a second channel extending from a second half of the extension lateral side opposite the first channel to the second pocket.

In another aspect of the disclosure, a method for operating a fluid machine with a thrust bearing coupled to a fluid source recites communicating fluid from the fluid source into a bearing chamber of a bearing of the bearing surface through a bearing channel, and rotating a rotating portion of the fluid machine having an extension extending into the bearing chamber. The extension divides the bearing chamber into a first pocket separated from a second pocket. The method also recites that when the extension is biased in a first direction, communicating fluid to a first plurality of extension channels into the first pocket from the bearing channel and, when the extension is biased in a second direction, communicating fluid to a second plurality of extension channels into the second pocket from the bearing channel.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 2:
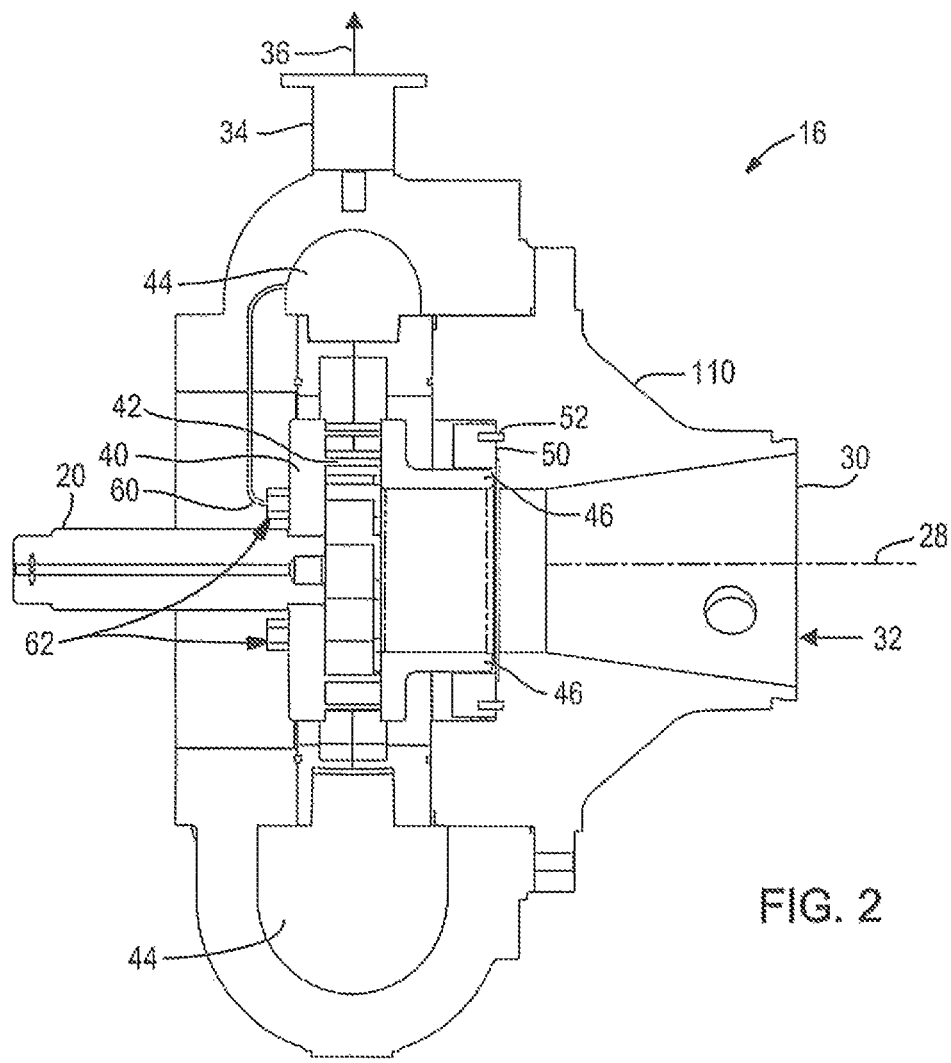
FIG. 2 is a cross-sectional view of a centrifugal pump according to the present disclosure.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

In the following description, a fluid machine is described as a centrifugal pump. However, there are other types of fluid machines that may benefit from the teachings set forth herein. For example, a turbine or the turbine and/or pump of hydraulic pressure booster may be used. Further, a location for the thrust bearing is illustrated in the following disclosure. Different orientations of thrust bearings may be utilized for different operating conditions.

Figure 1:
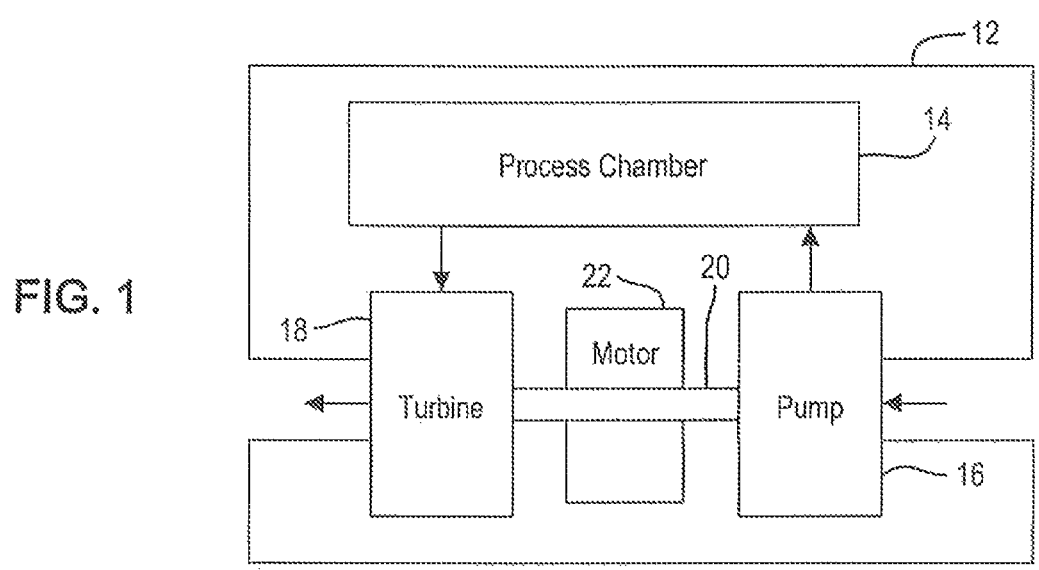
FIG. 1 is a block diagrammatic view of a pump motor and turbine coupled to a common shaft.

Referring now to FIG. 1, a hydraulic pressure booster (HPB) 10 is an example of fluid machine with a rotating portion. The hydraulic pressure booster 10 is part of an overall processing system 12 that also includes an intermediate process chamber 14. This hydraulic pressure booster 10 will include a pump portion 16 and a turbine portion 18. A common shaft 20 extends between the pump portion 16 and the turbine portion 18. The HPB 10 may be free-running which means that it is solely energized by the turbine and will run at any speed where the equilibrium exists between a turbine output torque and the pump input torque. The rotor or shaft 20 may also be connected to an electric motor 22 or an electric generator.

The hydraulic pressure booster 10 is used to boost the process feed stream using energy from another process stream which is depressurized through the turbine portion 18. Additional boost may be provided with an electric motor. Power generation can be performed if too much boost is in the system.

Referring now to FIG. 2, a fluid machine such as the centrifugal pump 16 is illustrated. The centrifugal pump 16 has a housing 110 that may be referred to as a casing. The housing 110 has a suction nozzle or inlet nozzle 30 that receives fluid in the direction illustrated by the arrow 32. The housing 110 has a discharge nozzle 34 that discharges fluid at a high pressure in the direction illustrated by the arrow 36. Fluid entering the inlet nozzle 30 is at a relatively low pressure compared to that of the discharge nozzle 34.

A rotating portion such as impeller 40 rotates on shaft 20. The shaft 20 is in alignment with the longitudinal axis 28 of the pump 16. The longitudinal axis 28 is illustrated as the center of the inlet nozzle 30.

The impeller 40 has vanes 42 that when rotated cause high pressure within the volute region 44 of the housing 110 as compared to the low pressure input fluid. It should be noted that the impeller 40 may be referred to as a rotating portion of the fluid machine because it rotates relative to the housing 110. The casing or housing 110 may be referred to as a stationary portion of the centrifugal pump 16.

The impeller 40 may also include an axially extending flange 46. The flange 46 is coupled to the impeller 40 and rotates with the impeller 40. The flange 46 may be made out of the same material and integrally formed or molded with the vanes 42 and the rest of the impeller 40.

A seal assembly 50 is coupled to the housing 110 using fasteners 52. The seal assembly 50 separates the low pressure input side of the centrifugal pump 16 with the higher pressures generated within the housing 110 by the rotating impeller 40. The seal assembly 50 prevents fluid from within the high pressure portion of the housing 110 from leaking into the lower pressure input nozzle 30.

In this example, the housing 110 may have a passage or channel 60 that communicates fluid to a thrust bearing 62. The thrust bearing 62, as illustrated, radially positions the impeller 40. Fluid from the volute region 44 is communicated to the thrust bearing 62. As mentioned above, it is desirable to provide relatively clean fluid to the thrust bearing 62. The operation and further details of the thrust bearing 62 are described below. A similar type passage may be formed to an input of a turbine. As is illustrated in FIG. 2, there is no filtering of fluid from the volute region 44, however, an external filter assembly may be provided to filter the fluid before reaching the thrust bearing 62.

Figure 3:
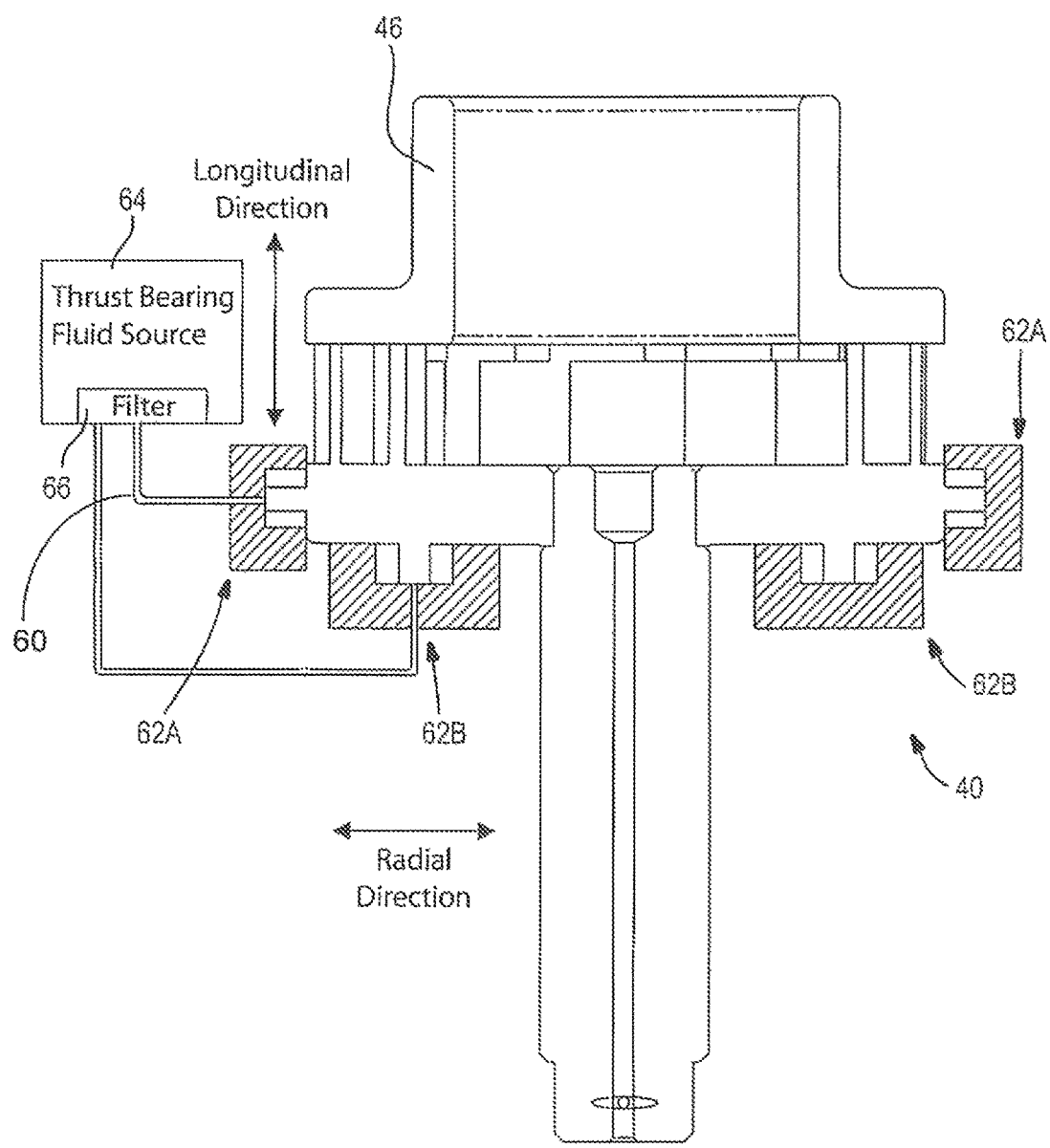
FIG. 3 is an side view of an impeller according to the present disclosure

Referring now to FIG. 3, an enlarged cross-sectional view of the impeller 40 and the thrust bearings 62 relative to a portion of the housing 110 is illustrated. The thrust bearings will be referred to collectively as thrust bearings 62. In this example, two different thrust bearings 62A and 62B are illustrated. Thrust bearing 62A is disposed on a radially outboard position of the impeller 40. Each thrust bearing 62 is in communication with a thrust bearing fluid source 64. The thrust bearing fluid source 64, if "clean" enough, may be provided directly to each thrust bearing 62A, B. Should the thrust bearing fluid source 64 have significant impurities, a filter assembly 66 may be used to filter the fluid from the thrust bearing fluid source prior to being provided to each thrust bearing 62A, 62B. Each thrust bearing 62A, 62B is annular in shape.

Although two different thrust bearings are illustrated, only one annular thrust bearing may be used. Thrust bearing 62A is disposed on an axial surface 68 prevents the impeller from moving in a longitudinal direction relative to FIG. 2. Thrust bearing 62B is disposed on a radial surface 70 and positions the impeller in a radial position. Both thrust bearings, 62A and 62B, are parallel or contact surfaces that connect with stationary housing and the rotating impeller and act as a thrust bearing between the two.

Figure 4:
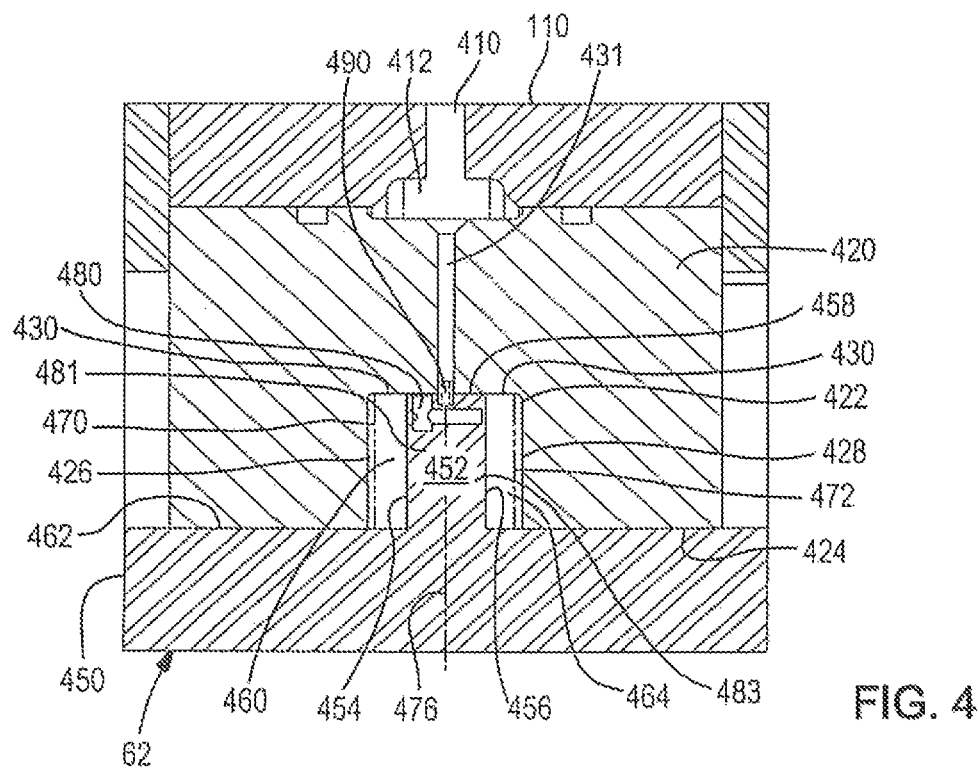
FIG. 4 is a cross-sectional view of the thrust bearing.

Referring now to FIG. 4, an enlarged view of the thrust bearing 62 is illustrated. Each thrust bearing 62A, 62B may be configured in a similar way. A portion of the stationary portion or housing 110 of the fluid machine is illustrated. The housing 110 has a working fluid inlet 410. A reservoir 412 is formed between a bearing portion 420 and the housing 110. The bearing portion 420 may be composed of various materials, such as plastic, graphite filled plastic, glass filled Noryl®, brass or Teflon®. Of course, in a tightly tolerance application, the bearing portion 420 may be formed of the same material as the housing 110. The bearing portion 420 has a bearing chamber 422 that forms a cavity between the bearing and the impeller 450 into a bearing surface 424. The bearing chamber or cavity 422 includes a first side 426 and a second side 428 and a lateral side 430. The bearing portion 420 has a bearing channel 431 therethrough that couples fluid from the reservoir 412 to the bearing chamber 422.

The thrust bearing 62 is formed with a rotating portion which is generically described as reference numeral 450. As mentioned above, the rotating portion 450 may be an impeller for a turbine or a pump or the like. The rotating portion 450 includes an extension 452 that extends into the bearing chamber 422. The extension 452 includes a first side 454, a second side 456 and a lateral side 458. The lateral side 458 has a first half connected to the first side 454 and a second half connected to the second side 456. A first pocket 460 is formed between the first side 426 of the bearing portion 420 and the first side 454 of the extension 452. A sealing surface 462 of the rotating portion 450 and the lateral side 430 also define the first pocket 460.

A second pocket 464 is defined between the second side 456 of the extension 452 and the second side 428 of the bearing chamber 422. The lateral side 430 of the bearing chamber 422 and the sealing surface 462 also define the second pocket 464.

The size of the first pocket 460 and the size of the second pocket 464 vary depending upon the position of the rotating portion 450. Lines 470 and 472 illustrate the maximum left work and right word position relative to FIG. 4 of the first side 454 and the second side 456 during operation.

The extension 452 has a center line 476 extending therethrough. A first metering port 480 within a first half 481 of the lateral side 458 of the extension 452 is provided. In the figure the left side of the center line 476 is the first half. The first metering port 480 is part of an extension channel 482 that extends between the metering port 480 and the second pocket 464 of the bearing chamber 422. It should be noted that the extension 452 is annular in shape and a plurality of ports 480 and channels 482 may be spaced around the rotor.

A recess 490 may also be disposed within the lateral side 458 of the extension 452. The recess 490 may be in axial alignment with the center line 476 of the extension 452.

In operation, fluid flows through the fluid inlet 410 into the reservoir 412. Fluid flows from the reservoir 412 into the bearing channel 431. In the alignment illustrated in FIG. 4, the metering port 480 does not receive fluid directly from the bearing channel 431. A small space is left between the lateral side 430 and the lateral side 458 that allows fluid to pass therethrough. This is described below. Fluid enters both the first pocket 460 and the second pocket 464. Fluid then flows between the bearing surface 424 and the sealing surface 462.

Figure 5:
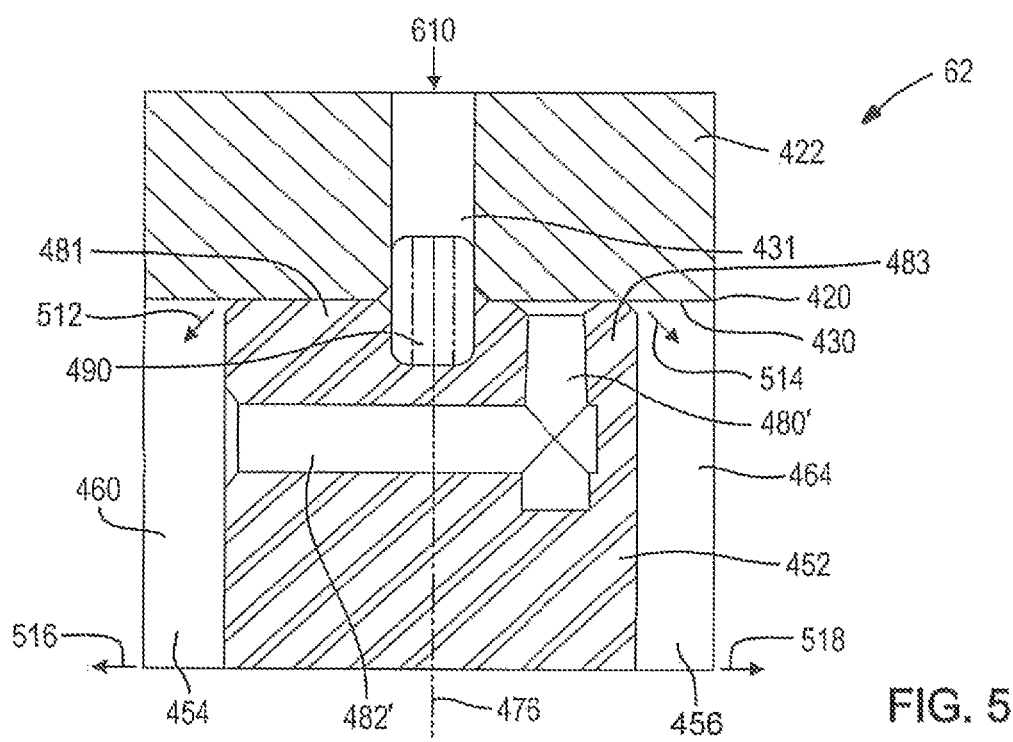
FIG. 5 is a close up view of the bearing chamber.

Referring now to FIG. 5, a second metering port 480' is part of a second channel 482' is disposed within the extension 452. In FIG. 5, the metering port 480' of the channel 482' is disposed on the right side or second half 483 of the center line 476 of the extension 452. The metering port 480' is therefore disposed on the opposite side of the center line 476 from the metering port 480 illustrated in FIG. 4. It should be noted that a combination of metering ports 480 and 480' are disposed in and around the extension 452. The metering ports 480, 480' may alternate and may be evenly or near evenly spaced around the extension 452. The metering port 480' and channel 482' communicate fluid into the first pocket 460.

Figure 6:
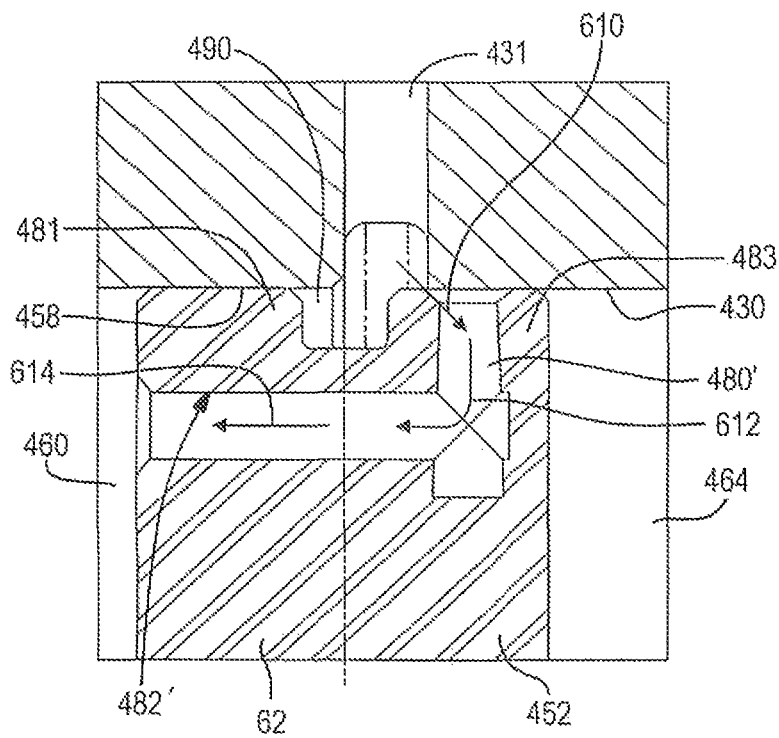
FIG. 6 is a cross-sectional view of the rotating portion biased to the left relative to the figure.

Referring now to FIG. 6, the thrust bearing 62 is shown with the metering port 480' in alignment with the bearing channel 431. The rotating portion 450 (illustrated in FIG. 4) and therefore, the extension 452 are offset to the left in the figure. As the amount of the port 480' exposed to the bearing channel 431 increases as movement to the left increases, more fluid flows directly into the first pocket 460. This motion and fluid flow forces more fluid into the first pocket 460 and therefore the first extension 452 moves rightward in an equilibrium type position. This causes the second pocket 464 to decrease in size. Ultimately, the extension 452 is desired to be aligned with the middle of the bearing channel 431.

The arrow 610 shows flow from the bearing channel 431 into the metering port 480'. Arrows 612, 614 show fluid flow metering port 480' into the channel 482'.

Figure 7:
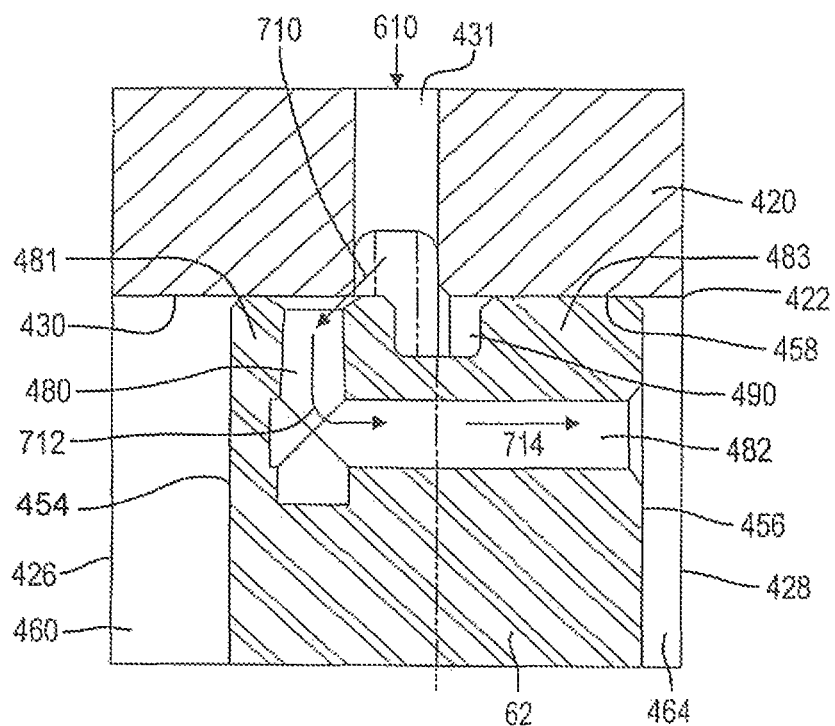
FIG. 7 is a cross-sectional view of when the rotating portion is biased to the right relative to the figure.

Referring now to FIG. 7, in this figure the thrust bearing 62 is biased to the right and therefore the second pocket 464 is smaller than the first pocket 460. The metering port 480 is at least partially aligned with the bearing channel 431 so that fluid flows therethrough. Fluid flows from the bearing channel 431 into the metering port 480 and into the second pocket 464 ultimately the amount of fluid flowing into the second pocket 464 increases and forces the rotating portion 450 and the extension 452 to move leftward so that the second pocket 464 increases in size while the first pocket 460 decreases in size. Arrow 710 shows movement of fluid from the channel into the metering port 480. Arrow 712 shows fluid flow from the metering port 480 into the remainder of channel 482. Arrow 714 shows fluid flow from the channel 482 into the second pocket 464.

Figure 8:
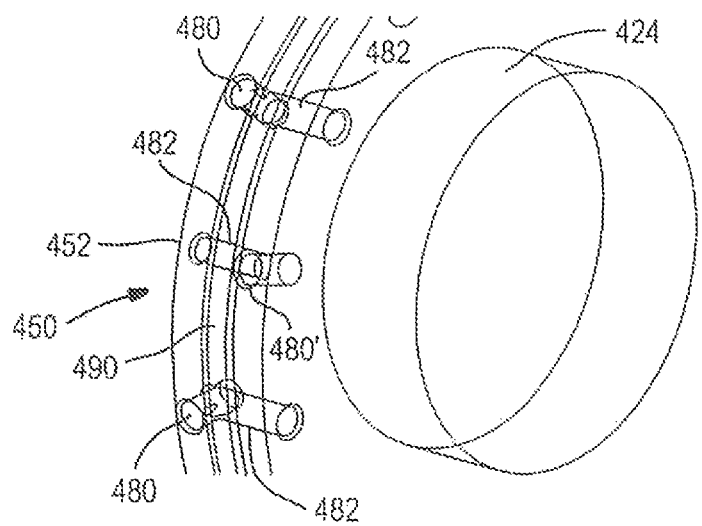
FIG. 8 is a perspective view of a portion of a rotating portion.

Referring now to FIG. 8, as was briefly mentioned above, a rotating portion 450 may include a plurality of spaced apart and alternating metering ports 480 and 480'. A portion of the rotating portion 450 is illustrated in FIG. 8 to illustrate this concept. The sealing surface 462 is also illustrated adjacent to the extension 452.

Figure 9:
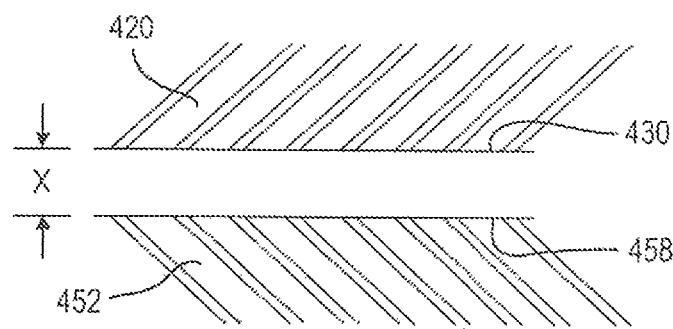
FIG. 9 is an enlarged view of the interface between the lateral sides of the extension portion and the bearing.

Referring now to FIG. 9, the bearing chamber lateral side 430 of the bearing portion 420 is illustrated adjacent to the extension lateral side 458 of the extension 452. In a normal operation the distance X is maintained by the fluid flowing from the bearing channel 431 and into either the first pocket 460 or the second pocket 464. It is desirable to maintain the particle size of the fluid flowing through the bearing channel 431 to smaller than the distance X between the lateral side 430 and the lateral side 458. This prevents fouling of the thrust bearing 62. As mentioned above, a filter assembly 66 (illustrated in FIG. 3) may be used to filter the particles within the thrust bearing fluid from the thrust bearing fluid source 64 (of FIG. 3).

Figure 10:
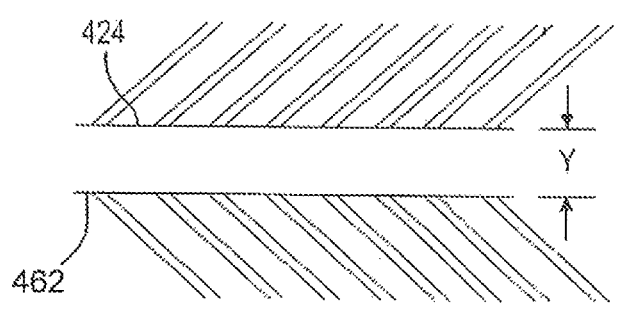
FIG. 10 is an enlarged cross-sectional view of the interface between the bearing and the sealing surface of the rotating portion.

Referring now to FIG. 10, a similar gap Y may be maintained between the bearing surface 424 and the sealing surface 462. The distance Y may correspond to the distance X illustrated in FIG. 9. It is desirable to maintain the size of the particles gap size Y.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A fluid machine in communication with a thrust bearing fluid source comprising:
    a housing having a bearing portion having a bearing surface, said bearing portion comprising a bearing channel receiving fluid from the fluid source;
    a rotating portion rotating at least partially disposed within the housing, said rotating portion having a sealing surface directly adjacent to the bearing surface;
    a thrust bearing disposed between the rotating portion and the bearing portion, said thrust bearing comprising
    a bearing chamber formed within the bearing portion, said bearing chamber comprising a bearing chamber lateral side, said bearing chamber receiving fluid from the bearing channel through the bearing chamber lateral side;
    an extension extending from the sealing surface of the rotating portion, said extension positioned within the bearing chamber so that a first pocket of the bearing chamber is disposed adjacent to a first side of the extension and a second pocket of the bearing chamber is disposed adjacent to a second side of the extension, said extension comprising an extension lateral side extending between the first side and the second side, said extension lateral side adjacent to the bearing chamber lateral side;
    said extension comprising a first channel extending from a first half of the extension lateral side to the second pocket; and
    said extension comprising a second channel extending from a second half of the extension lateral side opposite the first channel to the first pocket.

2. The fluid machine as recited in claim 1 wherein the rotating portion comprises an impeller.

3. The fluid machine as recited in claim 1 wherein the rotating portion comprises an impeller of a centrifugal pump and the housing comprises a centrifugal pump housing.

4. The fluid machine as recited in claim 3 wherein the bearing channel is in communication with a discharge of the centrifugal pump.

5. The fluid machine as recited in claim 1 wherein the bearing channel is in communication with an inlet of a turbine.

6. The fluid machine as recited in claim 1 wherein the thrust bearing fluid source is in communication with a filter assembly that communicates filtered fluid to the bearing channel.

7. The fluid machine as recited in claim 1 wherein the sealing surface is disposed on a radial surface of the rotating portion.

8. The fluid machine as recited in claim 1 wherein the sealing surface is disposed on an axial surface of the rotating portion.

9. The fluid machine as recited in claim 1 wherein the extension lateral side comprises an annular recess.

10. The fluid machine as recited in claim 9 wherein the annular recess is disposed in a center of the extension lateral side between the first side and the second side.

11. The fluid machine as recited in claim 1 wherein the bearing portion is composed of one of plastic, graphite filled plastic, and brass.

12. A method of operating a fluid machine with a thrust bearing coupled to a fluid source comprising: communicating fluid from the fluid source into a bearing chamber of a bearing of a bearing surface through a bearing channel; rotating a rotating portion of the fluid machine having an extension extending into the bearing chamber, said extension dividing the bearing chamber into a first pocket separated from a second pocket;

disposing a first plurality of extension channels on a first side of a lateral side of the extension opposite a second plurality of extension channels on a second side of the lateral side of the extension;

when the extension is biased in a first direction, communicating fluid to the first plurality of extension channels into the second pocket from the bearing channel and blocking the communication of fluid to the second plurality of extension channels into the first pocket from the bearing channel;

when the extension is biased in a second direction, communicating fluid to the second plurality of extension channels into the first pocket from the bearing channel and blocking the communication of fluid to the first plurality of extension channels into the second pocket from the bearing channel; and communicating fluid from the first pocket and the second pocket between the bearing surface of the bearing and a sealing surface of the rotating portion.

13. The method as recited in claim 12 further comprising filtering the fluid from the fluid source.

14. The method as recited in claim 12 wherein rotating the rotating portion comprises rotating an impeller.

15. The method as recited in claim 12 wherein communicating fluid from the fluid source comprises communicating fluid into an annular recess of a lateral side of the extension.

* * * * *